United States Patent [19]

Schisler et al.

[11] Patent Number: 4,767,793

[45] Date of Patent: Aug. 30, 1988

[54] METHOD OF PRODUCING A FOAM FROM A RADIATION-CURABLE COMPOSITION

[75] Inventors: Robert C. Schisler, Akron; Raymond E. Downey, Copley, both of Ohio

[73] Assignee: The Goodyear Tire & Rubber Company, Akron, Ohio

[21] Appl. No.: 1,066

[22] Filed: Jan. 7, 1987

Related U.S. Application Data

[63] Continuation-in-part of Ser. No. 797,358, Nov. 12, 1985.

[51] Int. Cl.⁴ ........................... C08F 2/46; C08F 2/48; C08F 2/50; C08J 9/30
[52] U.S. Cl. .................... 521/50.5; 427/54.1; 428/159; 428/160; 428/314.4; 428/318.4; 521/50; 521/149; 522/46
[58] Field of Search ........................................ 54/50.5

[56] References Cited

U.S. PATENT DOCUMENTS

| | | | |
|---|---|---|---|
| 3,326,787 | 6/1967 | Jacobs | 521/50.5 |
| 3,700,574 | 10/1972 | Kehr et al. | 526/64 |
| 3,715,293 | 2/1973 | Sandner et al. | 522/44 |
| 3,778,294 | 12/1973 | Krauch et al. | 521/50.5 |
| 3,891,523 | 6/1975 | Hisamatsu et al. | 522/96 |
| 3,940,349 | 2/1976 | Corbett | 521/50.5 |
| 4,038,350 | 7/1977 | Jaques | 521/50.5 |
| 4,112,017 | 9/1978 | Howard | 522/96 |
| 4,250,005 | 2/1981 | Lamplugh | 521/50.5 |
| 4,378,278 | 3/1983 | Allaway et al. | 521/50.5 |

FOREIGN PATENT DOCUMENTS 47904 4/1979 Japan .
1304112 1/1973 United Kingdom .

*Primary Examiner*—James C. Cannon
*Attorney, Agent, or Firm*—M. R. Dion, Sr.

[57] ABSTRACT

This invention relates to a process of producing a cured foamed polymer by mechanically frothing a radiation-curable composition and curing the frothed composition with radiation and using such foams in graphic art devices such as compressible printing blankets. It also relates to uses of unfoamed radiation-cured polymer in graphic art devices.

16 Claims, 2 Drawing Sheets

METHOD OF PRODUCING A FOAM FROM A RADIATION-CURABLE COMPOSITION

This is a continuation-in-part of copending application Ser. No. 797,358 filed Nov. 12, 1985.

FIELD OF THE INVENTION

This invention relates to a radiation-curable composition and a process for producing a polymeric foam from radiation-curable compositions. In particular, it relates to a process wherein a polymeric radiation-curable composition is mechanically frothed, and the froth is cured with radiation to form a foam. It also relates to laminates, such as printing blankets, produced using a foamed and/or non-foamed radiation-cured composition and to a process for producing said laminates. It is particularly applicable to uses where thin layers of foam are used.

BACKGROUND ART

The use of foam in compressible printing blankets and other graphic art devices such as printing blankets, engraver's gums, box die mounting boards and drawsheets is well known in the art.

Compressible printing blankets offer printers an advantage over noncompressible printing blankets by eliminating the need for precise underpacking to achieve an acceptable amount of pressure between printing plate, printing blanket and a paper or other material to be printed. Foam is often used in these compressible printing blankets to keep the pressure relatively constant over a wide range of squeeze. The foams are normally present in very thin layers. It is important that the foam be of such a nature that it has good compression set resistance and uniform compressibility and uniform gauge (so as to print uniformly) and is capable of being applied (during the manufacture of the blanket) and cured to a uniform gauge.

Foaming agents and blowing agents i.e., compounds capable of releasing gases such as carbon dioxide by decomposition, normally at high temperatures, have been used to produce foams in the past from polymer latices and solutions of polymers in organic solvents. Such foams have been cured at high temperatures, over an extended period of time, using sulfur as a curative.

Such systems if used to produce foam layers where uniform compressibility, uniform gauge and good compression set resistance are important, could be deficient in that the high temperature operations of foaming, curing and water or solvent removal can result in nonuniform foam formation. This is particularly true where the operations are time consuming, and result in a partial collapse of the foam before sufficient curing has occurred to maintain the foam structure and gauge. Such deficiencies can contribute to nonuniform compressibility.

There is a need, therefore, for foams possessing good compression set resistance and uniform compressibility, which are capable of being formed and cured to uniform gauge.

DISCLOSURE OF THE INVENTION

In accordance with the practice of the present invention, there is disclosed a process for producing a cured foamed polymer comprising:
 (a) mechanically frothing a radiation-curable composition; and
 (b) curing the frothed composition with radiation.

There is also disclosed a radiation-curable composition comprising:
 (a) an acrylated polyester urethane oligomer,
 (b) a hydroxy ethyl methacrylate reactive diluent,
 (c) 2,2-dimethoxy-2-phenylacetophenone photosensitizer,
 (d) a tri-aryl phosphate plasticizer, and
 (e) a polyoxyethylene octylphenol surfactant.

The process of the present invention avoids the necessity of high temperatures, blowing agents, solvent removal and lengthy cure times.

There is also disclosed a cured, foamed polymeric composition.

There are also disclosed laminates comprising a radiation-cured composition either in a non-foamed form or as a foam produced by the process of the present invention, or both. There is also disclosed a process for producing a laminate comprising radiation curing a photocurable composition through a fabric substrate using actinic radiation. There is also disclosed a process for producing a laminate comprising the radiation curing of a radiation-curable composition in contact with a transparent film having a matte or textured finish to provide a tack-free and/or textured surface to the cured polymer.

For a better understanding of the process of the present invention, reference is made to the appended figures which are for the purpose of illustration not of limitation.

Figure 1:
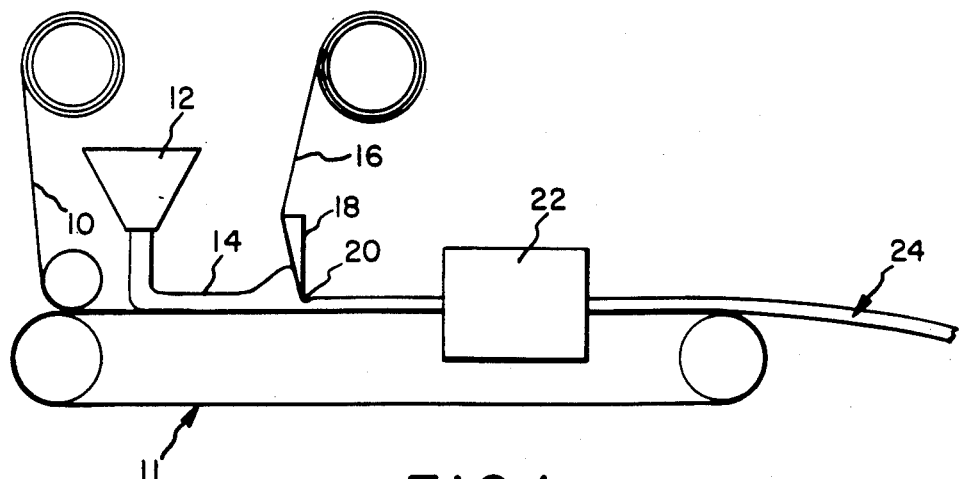
FIG. 1 is a schematic drawing illustrating one example of the process of the present invention of preparing a cured foam laminate.
Figure 2:
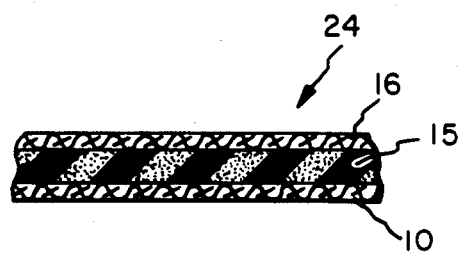
FIG. 2 is an enlarged section of the cured foamed laminate prepared in FIG. 1.

FIG. 1 is a schematic illustration of one of the embodiments of the present invention. A fabric substrate 10 is continuously fed to a conveying means 11. A frothed radiation-curable composition 14 is continuously deposited from a mechanical frothing means 12 onto the surface of the substrate 10. A second layer of fabric 16 is continuously placed upon the surface of the frothed radiation-curable composition 14 immediately before the composite of fabric and foam are passed beneath a doctor blade 18 which sets the gauge of the foam and the laminate at point 20. The composite is then exposed to radiation 22 where the foam is cured to form a cured foam laminate 24 (FIG. 2) comprised of the two layers of fabric 10 and 16 and the cured foam 15.

Figure 3:
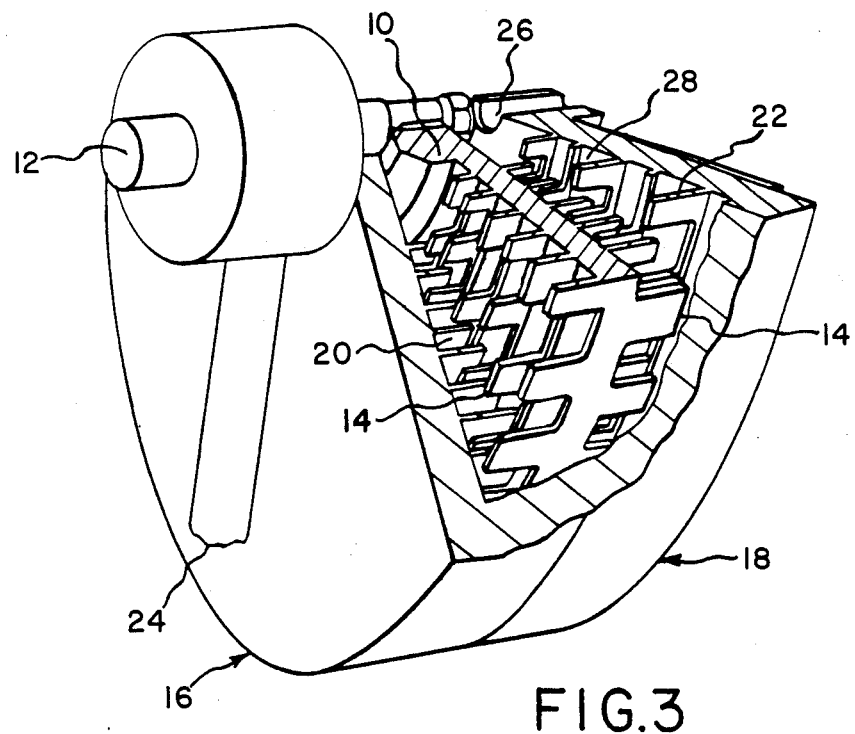
FIG. 3 is a sectional view of the mixing head of one type of mechanical frothing machine which can be used to practice the process of this invention.

FIG. 3 is a sectional view of the mixing head of one type of mechanical frothing machine which can be used to froth the radiation-curable composition in the practice of the process of the present invention. A rotor 10 is attached to rotatable rotor shaft 12 and has concentric rows of blades 14 extending axially from each of the two faces of the flat disc which defines the central core of the rotor 10. The rotor 10 is enclosed by a rear stator 16 and a front stator 18 each of which have concentric rows of stator blades 20,22 which extend axially inward from their internal surfaces to be located between the rows of rotor blades 14.

Figure 4:
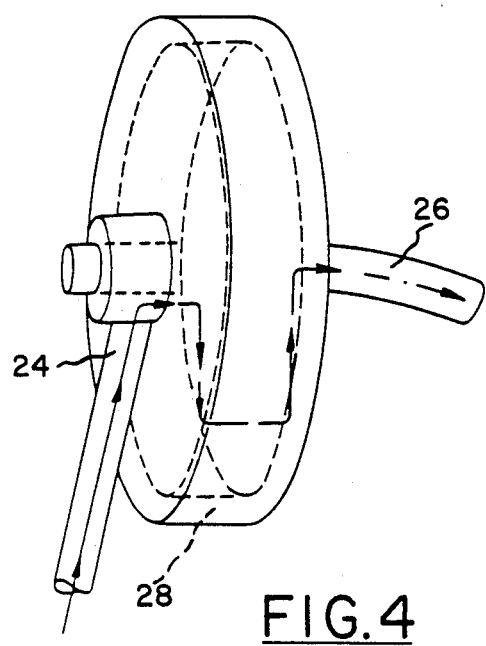
FIG. 4 is a schematic view illustrating the flow FIG. 3.

In operation, the rotation of the rotor 10 and its blades 14 provides a shearing and cutting action to the liquid or liquid and gas mixture as the rotor blades 14 interact with the stationary stator blades 20 and 22. The flow pattern through the mixing head is shown schematically in FIG. 4 where the liquid or liquid/gas mixture is injected through inlet 24 into the center of the rear stator 16 where it flows radially outward between the rotor blades 14 and the rear stator blades 20 to the end of the annular cavity 28 at the outer periphery of the rotor 10. It then flows across the end of annular cavity 28 and radially inward between the rotor blades 14 and the front stator blades 22 to the outlet 26 at the center of the front stator 18.

The foam of the present invention possesses good compression and compression set resistance properties. These properties are important when the foam is used in products such as printing blankets where uniform compression and good compression set resistant characteristics are highly desirable. The foam of the present invention can be applied, e.g. by spreading, at a uniform gauge. It also possesses a uniform specific gravity. The uniform gauge and uniform specific gravity result in uniform compressibility, an important feature in compressibility sensitive products such as printing blankets.

Radiation treatment of compositions to produce cured polymeric materials is well known in the art, which discloses the various forms of radiation which can be used, when photoinitiators and/or photosensitizers should be used, what compositions may be cured and/or polymerized by the radiation (for example, reactive diluent/oligomer compositions), etc.

The mechanical frothing of liquid compositions to produce polymeric foams is also well known.

The present invention involves the discovery that by using well known mechanical frothing techniques with well known radiation techniques, a polymer foam layer can be prepared which has uniform compressibility across its entire surface as well as good resistance to compression set. Both of these properties are extremely important in the very thin foam layers which are used in graphic arts devices.

In general, other than otherwise described herein, the conventional, well known techniques of mechanical frothing and radiation curing are applicable and are used in the practice of the present invention.

Representative of prior art, which reveals radiation curing techniques and radiation-curable compositions are U.S. Pat. Nos. 3,560,237; 3,535,193; 3,637,419; 3,700,541; 3,700,574; 3,715,293; 3,719,638; 3,891,523; 3,899,611; 4,038,350; 4,112,017; 4,376,800; 4,387,012; 4,483,951; 4,057,188 and Great Britain Patent Number 1,304,112.

The language "radiation curing" as used herein is intended to include photopolymerization, photocuring and all forms of polymeric matrix (network) formation resulting from radiation including but not limited to, covalent carbon to carbon crosslinkings, homopolymerization, copolymerization, branching and grafting.

The foams and foam layers of the present invention have the following characteristics.

The voids (bubbles) resulting from the frothing technique are essentially spherical in shape and are empty, i.e. do not contain foreign matters such as hollow microspheres or microballoons or frangible bubbles or the byproducts of chemical blowing agents or remnants thereof. The foam is also essentially closed cell.

The foam layer is essentially skin-free. This differs from some prior art foams where either or both of the upper and lower portions of the foam layer have a much lower concentration of voids, i.e. a lower void to solid ratio than the middle portion of the foam layer, either intentionally or unintentionally, so in essence, to form a relatively nonfoamed, skin layer.

Where the foam layer is very thin, for example in printing blankets, the formation of a dense layer, essentially free of voids, within the foam layer, can seriously reduce the low density portion of the foam. For example, where a foam layer is 0.3 mm thick and possesses a top and bottom portion which are essentially nonfoamed, and each 0.1 mm thick, the foamed portion in the center of the layer would only be 0.1 mm thick. In the skin-free foam of the present invention, essentially the entire 0.3 mm of thickness would be foamed.

This not only provides increased compressibility, but should a variation in the gauge of the foam portion occur, for example in applying the foam layer by spreading, prior to curing or during curing, the variation in compressibility would be greater for the prior art foam discussed than for the foam in the present invention.

Some prior art foams are prepared by compounding a thin layer of polymer with salt and then extracting the salt with water to form voids. This salt extraction process forms voids with an irregular nonspherical, nonelliptical shape which have a greater tendency to merge into one another thereby creating void networks. The foam of the present invention does not have irregularly shaped voids and such networks. Rather the voids in the foam of the present invention, as previously mentioned herein, are essentially spherical.

Some foams require the presence of microballoons or cork or ground sponge rubber or microspheres or frangible bubbles which either remain intact during the use of the foam or collapse or fracture during the use of the foam, the remnants thereof remaining within the voids. The voids in the foam of the present invention are empty, i.e., contain no such structures or remnants thereof.

The foam of the present invention is a closed cell foam, i.e. normally at least 80% of the void volume does not interact to form networks or pores. The foam of the present invention is particularly advantageous when used in thin layers, for example those having a gauge between .08 and 1.0 mm, particularly 0.25 to 0.5 mm.

Laminates can be formed using the process and the foam of the present invention, where the foam is sandwiched between two layers of fabric, without the use of additional adhesives to adhere the foam to the fabric. The foam is its own fabric adhesive.

The radiation-curable composition of the present invention must have a liquid consistency to permit the mechanical frothing. If the liquid consistency can be obtained by heating a composition, such heating is permissible.

Radiation-curable compositions can be obtained by mixing a high molecular weight polymer with a reactive diluent which is sufficiently miscible with the polymer to create a composition with a viscosity suitable for applying to a substrate and for foaming.

As one alternative the solid composition can be heated to a molten liquid state to provide a suitable viscosity.

While not limited thereto, the process of the present invention may be used with polymers which are homopolymers of conjugated dienes such as polybutadiene and polyisoprene as well as copolymers of conjugated dienes and vinyl monomers such as butadiene/styrene and butadiene/acrylonitrile copolymers. Other examples of polymers that may be used are ethylene/propylene copolymers and terpolymers as well as polychloroprene and natural rubber.

If the radiation-curable composition is prepared from an oligomer i.e., a low molecular weight polymer (normally with the molecular weight below 30,000 and more normally in the range of 500 to 6,000 and most normally in the range of 1,000 to 5,000) and the viscosity of the oligomer is sufficiently low to be a liquid at room temperature or with some heating, it may be used with or without a reactive diluent as part of the radiation-curable composition. If no reactive diluent is used, then the oligomer must itself be reactive so as to form a polymer matrix during the radiation step. That is, the oligomer must contain reactive sites such as unsaturation in the form of carbon to carbon double bonds and/or epoxide groups which are activated by radiation, and if necessary, in the presence of a photoinitiator and/or a photosensitizer, to result in free radical and/or cationic cures. If a reactive diluent is used, the oligomer can be reactive or nonreactive. If the oligomer is nonreactive, then the reactive diluent is preferably multifunctional so as to form a polymer network.

Preferred compositions are combinations of a reactive oligomer and a reactive diluent.

The cured foam is a matrix, i.e., polymer network. The network is comprised of a homopolymer of the reactive diluent, when used and/or a copolymer of the diluent with the oligomer when the oligomer is reactive. There can also be covalent carbon to carbon crosslinking between the polymeric materials of the matrix. The crosslinking is more likely to occur with electron beam radiation, than, for example, actinic radiation.

Unless stated otherwise herein the general rules taught by the prior art regarding radiation curing apply. For example, generally, when actinic radiation is used, the radiation-curable composition should contain reactive carbon to carbon double bonds, i.e., unsaturation, and photoinitiators and/or photosensitizers should be used. However when a higher energy radiation, such as electron beam, is used, the unsaturation and photoinitiators/photosensitizer requirements are diminished. Overall, simple experimentation, coupled with prior art disclosures will permit selection of the proper radiation parameters for the particular result desired.

While terms such as photoinitiator and photosensitizer as well as oligomer, reactive diluent surfactant , plasticizer, etc., are well known in the art, the following is a brief description of such terms.

Oligomer includes low molecular weight polymers having only a few monomer units. Typical oligomers are those having number average molecular weights in the range from 500 to 6000, but some consider oligomers to have molecular weights as high as 30,000.

Oligomers may be reactive or non-reactive. A reactive oligomer includes ones which are capable of forming a free radical by exposure to radiation in the presence, if necessary, of a photoinitiator and/or photosensitizer, and normally contains unsaturation. It is to be understood that oligomers can include those materials which can be cured by exposure to radiation by other than a free radical mechanism, e.g. epoxides, which are radiation cured by means of photolytically generated cationic catalysts. The reactive oligomers are preferred because they take part in the polymerization or crosslinking reaction which is initiated by radiation as opposed to the non-reactive oligomers which are incorporated within the network of the polymerized reactive diluent.

A reactive diluent is a low viscosity monomer which is compatible with the oligomer and is used to lower the viscosity of the oligomer to a manageable liquid state and also to take part in the radiation initiated polymerization or crosslinking. Reactive diluents can be multifunctional monomers or monofunctional monomers. Typical multifunctional monomers are the di- and triacrylates and methacrylates. Typical monofunctional monomers are the alkyl-acrylates, aryl-acrylates and alkoxyalkyl-acrylates and methacrylates. The reactive diluents not only function to reduce the viscosity of the oligomer but also affect the cure rate as well as the properties of the cured composition.

A photoinitiator is a compound which is effective to promote free radical addition polymerization by generating reactive species, such as free radicals, by way of unimolecular scission resulting from photoexcitation.

Photosensitizers are compounds which are effective to promote free radical addition polymerization through bimolecular photochemical reactions of the energy donor or transfer type or hydrogen abstraction type or by formation of a donor-acceptor complex with monomers or additives leading to ionic or radical species.

It is preferred to use a plasticizer and a surfactant in radiation-curable compositions which are to be frothed and radiation-cured.

A plasticizer is a compound added to a polymer both to facilitate processing and to increase the flexibility and toughness of the final product.

A surfactant is a compound which reduces the surface tension of a liquid or which reduces the interfacial tension between two liquids or between a liquid and a solid and promotes the stability of froths.

Radiation-curable means capable of being crosslinked and/or polymerized and/or copolymerized by exposure to radiation either inherently, i.e., in the absence of photoinitiators and/or photosensitizers, or through the use of photoinitiators and/or photosensitizers. By radiation, it is meant to exclude thermal radiation and low energy electromagnetic radiation in the microwave and radiowave regions but to include ionizing radiation such as gamma rays, x-rays and subatomic charged particles when accelerated in a cyclotron or betatron.

Photocurable is used to denote the capability of being cured by actinic type radiation i.e., radiation in the visible and ultraviolet spectral regions. A photopolymerizable composition is one capable of being cured by actinic radiation and generally contains a photoinitiator and/or photosensitizer.

Again, all the above are guidelines, radiation curing techniques being well known in the art.

By mechanical frothing is meant the homogeneously and uniformly dispersing of a gas by mechanical means throughout the liquid radiation-curable composition which is devoid of blowing agents, as opposed to the in situ generation of gases, such as carbon dioxide, by the decomposition of blowing agents such as azodicarbonamide or the expansion of liquid gases, such as Freon TM, to the gaseous state in the radiation-curable composition by the release of pressure thereon. The mechanical frothing involves the introduction and dispersion of air or other inert (i.e., non-reactive with the composition) gas into the radiation-curable composition by means of high shear agitation or mixing so as to produce a highly concentrated dispersion of bubbles in a liquid to define a froth. It also includes bubbling of gases generated externally of the liquid radiation-curable composition through said composition.

Representative of equipment and techniques used in mechanical frothing are blenders; homogenizers such as colloid mills: mechanical frothing machines such as those sold by the Oakes Machine Corporation and Ease, Inc, which continuously inject a gas into a liquid and provide high agitation and dispersion; wire whips, such as Hobart mixers with planetary gears; etc. Preferred are the mechanical frothing machines.

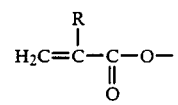

Further examples of oligomers are those conforming to the following structural formulae where R in each case is hydrogen or methyl and HDO, ADA and TDI represent the condensed form of hexane diol, adipic acid and toluene diisocyanate respectively. N is a whole number typically from 1 to 30.

ACRYLATED AND METHACRYLATED URETHANES

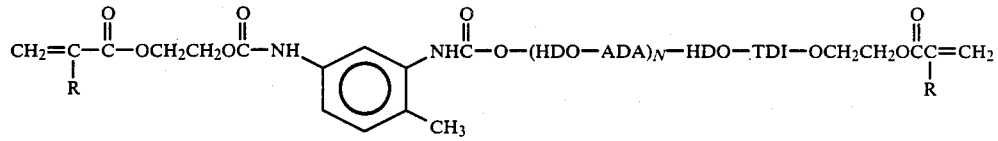

ACRYLATED AND METHACRYLATED POLYETHERS

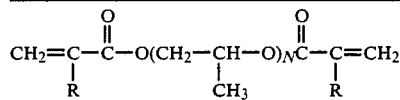

ACRYLATED AND METHACRYLATED POLYESTERS

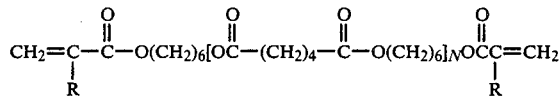

ACRYLATED ACRYLICS

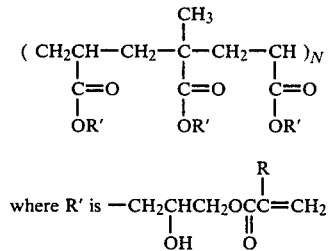

The froth is normally distributed on a releasable sheet, on a substrate or between two substrates, one or both of which will allow the passage of radiation, then exposing the froth to radiation until cured.

As mentioned earlier, any radiation-curable composition which is a liquid or can be made a liquid by heating can be used in the process of producing the cured foamed polymer. The only criteria required is that it be capable of being frothed and remain in the frothed state until cured by radiation. Preferably the radiation-curable composition will comprise:

(a) an oligomer; exemplary of oligomers which can be used are aliphatic or aromatic urethane acrylate oligomers, epoxy acrylates, cellulosic acrylates, alkyd acrylates, polythiols, epoxies, polyesters, especially those which are unsaturated, acrylated polyester urethanes, vinyl esters, acrylated epoxy urethanes, acrylated polyether urethanes, acrylated polyester-polyether urethanes, etc.

Typical reactive oligomers are those having a acrylic or methacrylic acid ester groups conforming to the following structural formula wherein R is selected from the group consisting of hydrogen and methyl.

(b) a reactive diluent, which is an ethylenically unsaturated monomer which is homopolymerizable and compatible and polymerizable with the oligomer when the oligomer is reactive, and is used to adjust the viscosity of the composition and to contribute to the physical properties of the cured elastomer; exemplary of the reactive diluents which can be used in the present invention are: styrene, vinyl toluene, α-methyl styrene, methyl acrylate, methyl methacrylate, propyl acrylate, butyl acrylate, 2-ethylhexyl acrylate, cyclohexyl acrylate, isodecyl acrylate, vinyl acetate, 2-phenoxy acrylate, glycidyl methacrylate, tetrahydrofurfuryl methacrylate, caprolactone acrylate, 1,6-hexanediol diacrylate, pentaerythritol triacrylate, trimethylol propane triacrylate, aryloxyalkyl acrylates, and methacrylates, alkoxyalkyl acrylates, and methacrylates such as 2-hydroxyethyl methacrylate, 2-hydroxypropyl methacrylate, N-vinyl pyrrolidone, polypropylene glycol monomethacrylate etc.

(c) a photoinitiator and/or photosensitizer capable of initiating or accelerating radiation curing especially where the source of radiation is actinic rather than electron beam and/or the oligomer or reactive diluent is not inherently radiation-curable; exemplary of the photoinitiators/photosensitizers which can be used are: benzophenone, benzoin, acetophenone, benzoin methyl ether, Michler's ketone, xanthone, propiophenone, fluorenone, carbazole, 2-, 3-, or 4-methylacetophenones, chlorothioxanthones, 2-acetyl-4-methylphenyl acetate, 2,2-dimethoxy-2-phenylacetophenone, etc.

(d) a plasticizer to retain compression and permanent set resistance properties and/or to make a softer foam; exemplary of the plasticizers which can be used in the practice of the present invention are: halogenated organics, tri-aryl phosphates, carboxylic acid esters of organic alcohols, phosphate esters of organic alcohols, etc.

(e) a surfactant to enhance the frothing as well as to stabilize the froth prior to and during radiation curing; exemplary of surfactants which can be used are: alkylaryl polyether alcohols, dioctyl sodium sulfosuccinate, silicone fluids, etc.

The levels of the components which can be used, based on parts by weight per 100 parts by weight of the oligomer are: 5–80 parts, preferably 15–40 parts of the reactive diluent; 0.5–10 parts, preferably 1–3 parts of the photosensitizer; 5–30 parts, preferably 15–25 parts of the plasticizer; and 0.5–5 parts, preferably 1–2 parts of the surfactant.

Other materials can be included in the composition, such as antioxidants, inhibitors, flame-retardant agents, tackifiers, and the like, the criteria being that the materials do not significantly impede the polymerization of the composition, nor prevent the transmission of radiation.

Where actinic radiation is used to cure the radiation-curable composition, the composition as well as any substrate, for example, fabric, through which the actinic radiation passes, which is located between the radiation source and the composition, must be light colored, i.e., not so dark as to absorb large amounts of the actinic radiation and thereby inhibit the curing of the composition. For example where actinic radiation is used the composition should not contain carbon black.

A preferred radiation-curable composition is comprised of a polyester urethane acrylate oligomer and an acrylate or methacrylate reactive diluent.

A particularly preferred oligomer is one where a mixture of ethylene glycol and propylene glycol (preferably in a respective molar ratio of about 80/20) is condensed with adipic acid to form a polyester having a number average molecular weight of approximately 500 to 6,000, preferably 1,000 to 4,000. The polyester oligomer is then reacted with toluene diisocyanate to form a polyester urethane which is then acrylated with at least one compound selected from the group consisting of hydroxy ethyl acrylate and hydroxy ethyl methacrylate. The final product typically can have a molecular weight of 3,000 to 6,000. Particularly preferred as reactive diluents are hydroxy ethyl acrylate, hydroxy ethyl methacrylate, diethylene glycol diacrylate, diethylene glycol dimethacrylate, tripropylene glycol diacrylate, tripropylene glycol dimethacrylate, tetra hydrofurfuryl methacrylate, isocyanato methacrylate, tetra ethyleneglycol dimethacrylate, 1,6-hexane diol dimethacrylate, pentaerythritol-tetramethacrylate.

The frothing is best accomplished by using any one of a number of commercially available high-shear mixers into which is metered the radiation-curable composition and the air or inert gas such as nitrogen. The ratio of gas to liquid is adjusted to produce a foam having the desired void volume and compressibility as well as physical properties. Generally, the gas will represent from 10% to 90% by volume of the cured foam, preferably 15% to 65%.

The froth is discharged from the mixer and distributed on a releasable sheet or substrate either batchwise or continuously. In a preferred embodiment, a continuous process is used wherein the releasable sheet or substrate is pulled through a spreading means or is moved while supported on a conveyor belt and a bank of froth is built up behind the spreading means, such as a doctor blade, in order to provide the precise gauge of the froth to be cured. The source of radiation is placed downstream of the spreading means to quickly cure the foam in order to avoid changing the gauge, losing bubbles, or changing the bubble size. For example, in a typical situation, the froth can be cured in less than five seconds after spreading to the proper gauge. The present invention also precludes the need to evaporate a solvent which can cause variations in gauge as well as the need to contain and/or recover the emissions resulting therefrom. The fact that the present invention is generally carried out at room temperature and at atmospheric pressure also results in energy savings. After curing, the foam can be removed from the release sheet or left with the release sheet or substrate and stored on a roll to be used as is, or to be further processed into laminates.

In another preferred embodiment, it was unexpectedly found that the froth can be sandwiched between two substrates of tightly woven fabric or non-woven fabric, which are not optically transparent and the fabric exposed to actinic radiation to bring about a cure of the froth. The only criteria for the substrate is that it be capable of transmitting the particular type of radiation and that the substrate not be adversely affected by the radiation-curable composition. Exemplary of the fabrics which may be used in the practice of this invention are: cotton, nylon, polyester, aramid, rayon, acrylics, and the like. Depending on the type of fabric, i.e., its weave, type of material, dip composition, etc., greater or lesser amounts (intensities) of actinic radiation will be necessary for a proper degree of cure. Also where actinic radiation is used, the substrate should have a light color.

Due to the short time required to completely cure the radiation-curable polymer composition, usually from about 0.5 seconds to about 60 preferably 1 to 15, seconds if commercially available high intensity actinic radiation or high energy electron beam radiation sources are used, additional stages can be constructed to add further layers to the laminates.

It is to be understood that the state of cure can be varied by controlling the exposure time, the quantity of radiation, the distance from the source of radiation to the composition and the rate at which the composition is passed by the radiation source. Various states of cure can be utilized to provide any properties to the polymer which would make it more conducive to downstream processing.

It should be noted that the frothed material need not be completely cured by radiation to benefit by the practice of the present invention. Rather it is sufficient that it be cured to a degree sufficient to cause the foam to maintain its structure indefinitely, i.e., to avoid the collapse of a significant portion of the frothed material and to maintain the gauge. The radiation-curable composition can be compounded with other curatives such as sulfur or peroxides to permit completion of the cure to the extent desired, for example at higher temperatures, or the curing can be completed by use of radiation.

Sometimes it is actually beneficial to only partially cure the radiation-curable composition, for example when it is desirable that the surface of the foamed composition remain tacky for purposes of adhesion to a layer of material to be applied thereto subsequently in preparing a laminate. Completion of the cure can then follow.

Where resistance to compression set is desired it is normally best to cure in the absence of sulfur to avoid the presence of polysulfide crosslinks, so as to provide a polymeric matrix absent polysulfide crosslinks.

It has been found that at any stage, a variety of layers can be added to the laminates, e.g. additional layers of foam produced by the process of this invention: non-foamed radiation-curable composition to be used either to adhere another layer of substrate, or as a topcoat; transparent films, in particular those having a matte or textured finish, to be placed over a layer of frothed or unfrothed radiation-curable polymer composition to serve as release sheets to provide tack-free surfaces, or to create a surface effect if the films are textured with a pattern or design; adhesives; other conventional rubbers; or any combinations thereof.

One advantage to the process of the present invention is that it can be carried out at room temperature. Another advantage is that it does not require an inert atmosphere. It was unexpectedly found that even radiation-curable compositions which are air-inhibited, i.e. those wherein air or oxygen inhibits the curing, can be cured even when air is used as the frothing gas, thus producing a foam comprising a matrix of a radiation-curable composition and a cellular structure of air. Of course, the reaction can also be carried out in an inert atmosphere, e.g., in the presence of nitrogen.

There are four main sources of radiant energy: gamma rays, high energy electrons, neutrons, and actinic. Each of these sources has its respective advantages and disadvantages. The use of radiant energy to cure polymers is of fairly recent origin, and it is only in the last several years that the two most commercially attractive sources, actinic and electron beam, have been developed for use in industry. The apparatus or equipment necessary for generating the radiation is not the subject of this invention, and any source or apparatus capable of generating the required intensity of radiation can be used which is known in the art.

A radiation-curable composition which has been developed to be particularly suitable for use in the practice of the present invention comprises:

(a) a polyester urethane acrylate oligomer;
(b) hydroxyethyl methacrylate (reactive diluent);
(c) 2,2-dimethoxy-2-phenylacetophenone (photosensitizer)
(d) a mixture of tri-aryl phosphates (plasticizer); and
(e) a polyoxyethylene octyl phenol surfactant.

The radiation-curable composition of the present invention is especially useful in laminates, particularly flexible laminates.

When the above composition is used as a topcoat for the laminates of this invention, the surfactant can, but need not, be excluded and minor amounts of color imparting agents may be included. When the above composition is used as an intermediate or bonding layer, both the surfactant and the plasticizer can, but need not, be excluded.

Generally the apparatus for producing a cured foamed polymeric composition comprises: a vessel for containing and dispensing a liquid radiation-curable composition wherein a photoinitiator or photosensitizer is dissolved in a reactive diluent to form a solution followed by mixing in the solution, a surfactant and a plasticizer, then blending that mix with an oligomer; a conduit for transferring the resulting liquid radiation-curable composition from the vessel to a mechanical frothing machine; means for injecting a frothing gas into the liquid radiation-curable composition in the conduit at a point proximate to the mechanical frothing machine, such as an eductor or a mixing tee; a mechanical frothing machine to homogeneously and uniformly disperse the frothing gas in the form of small bubbles throughout the liquid radiation-curable composition to produce a dispersion or froth and which has a discharge conduit; means for conveying the froth from the discharge conduit to a source of radiation; and a source of radiation for curing the froth into a foamed polymeric composition. Optionally a spreading mechanism can be included to cooperate with the conveying means to set the gauge of the froth.

It is preferred that after blending together all the ingredients to form the liquid radiation-curable composition that the composition be allowed to deaerate in order to provide for more precise metering of the composition itself as well as to provide a more consistent metering in of the frothing gas, either air or an inert gas such as nitrogen, to produce a froth having a specific gravity which can range from about 0.450 to about 0.875 upon its discharge from the mechanical frothing machine. It will be appreciated that the applications for the foam or the laminates of the present invention and the desired amount of compressibility will allow the determination of what specific gravity is required through simple experimentation. It should be noted, however, that the specific gravity of the radiation-curable composition impacts directly on the specific gravity of the froth and variations below and above the indicated range is within the scope of this invention.

It is also preferred that the apparatus for carrying out the process of the present invention be a closed system from the vessel to the point of discharge from the mechanical frothing machine in order to preclude premature polymerization, particularly where the composition is photopolymerizable.

The means for conveying the froth from the discharge conduit of the mechanical frothing machine can be a substrate to which the froth is to be laminated or a release sheet from which the subsequently cured foam is to be separated or a laminate which is to be further processed by adding additional layers.

Included in the laminates which are the subject of this invention, but not limited thereto, are the compressible laminates comprised of various layers as shown in Table I.

TABLE I

| | Compressible Laminate Constructions | | | | | | | | | | | | | | |
|---|---|---|---|---|---|---|---|---|---|---|---|---|---|---|---|
| Laminate | A | B | C | D | E | F | G | H | I | J | K | L | M | N | P |
| Layers | | | | | | | | | | | | | | | |
| 1 | R | R | R | R | R | R | R | R | R | F | F | F | F | S | R |
| 2 | F | S | S | S | S | S | S | F | S | S | PP | PP | S | F | S |

TABLE I-continued

| Laminate | A | B | C | D | E | F | G | H | I | J | K | L | M | N | P |
|---|---|---|---|---|---|---|---|---|---|---|---|---|---|---|---|
| 3 | S | F | F | F | F | F | F | PP | PP | A | S | S | PP | S | PP |
| 4 | A | S | S | S | S | S | S | S | F | PSA | A | F |  |  | S |
| 5 | PSA |  | F | A | F | PP | PP | A | PP |  | PSA | S |  |  | F |
| 6 |  | S | PSA | S | S | S | S | PSA | S |  |  | A |  |  | S |
| 7 |  |  |  |  | A |  | PP |  | A |  |  | PSA |  |  |  |
| 8 |  |  |  |  | PSA |  | S |  | PSA |  |  |  |  |  |  | wherein,
F = a layer of foamed radiation-curable polymer produced by the process of this invention,
PP = a layer of non-foamed radiation-curable polymer composition,
R = a layer of topcoat,
S = a layer of substrate,
A = a layer of tie-ply adhesive, and
PSA = a layer of pressure sensitive adhesive.

The layer F, of foamed radiation-curable polymer is prepared according to the process of the present invention as hereinbefore disclosed. The foam layer serves to provide compressibility for the laminate. In particular, in printing applications, it compensates for a range of impression settings.

The layer PP, of non-foamed, radiation-curable polymer composition, preferably with the surfactant and the plasticizer excluded, serves as a bonding agent between the layers adjacent to it. Preferably, it can also contain an adhesion promoter such as dimethylamino ethyl methacrylate.

The layer R, of topcoat, can be prepared from any one of a number of conventional elastomeric compositions and blends thereof, e.g. natural rubber, polyisoprene, polybutadiene, copolymers of styrene and butadiene, copolymers of acrylonitrile and butadiene, polyacrylonitrile, copolymers of acrylonitrile, butadiene and styrene, polychloroprene etc. It can also be non-elastomeric polymers such as nylon, etc. It can also be the non-foamed radiation-curable polymer composition, preferably with the surfactant excluded. When intended for use as a printing transfer surface, a preferred criteria for the topcoat is that it be resistant to the solvents used in printing ink formulations.

The layer S, of substrate, can be a woven fabric, a non-woven fabric, or a plastic film. Examples of the woven fabric are cotton, nylon, polyester, aramid, rayon, acrylics, and the like. Non-woven fabrics are produced by matting together fibers and bonding them by fusion, by the use of adhesives, or by needle punching. The substrate layer provides dimensional stability to the laminates. Examples of the plastic films are polyvinylchloride, polyethylene, polypropylene, polyesters, and the like.

The layer A, of adhesive, can be any adhesive capable of forming a strong enough bond between the substrate and the pressure sensitive adhesive layers so as to preclude separation of the pressure sensitive adhesive from the laminate. A particularly suitable adhesive is based upon a copolymer of acrylonitrile and butadiene compounded with curatives and resins and dissolved in methyl ethyl ketone.

The layer PSA, of pressure sensitive adhesive, provides the anchoring means for attaching the laminate to a cylinder or roll such as a printing press. Any one of a number of pressure sensitive adhesives may be employed. The main criterion for the pressure sensitive adhesive is that it have sufficient shelf life to retain its adhesive properties until the laminate is sold and used. Particularly suitable would be any one of a number of acrylic pressure sensitive adhesives.

In the following descriptions of laminate construction, the gauge ranges in mm, of the layers are in parentheses after the name of the layer. Laminate A of Table I is prepared from a single layer of substrate (0.13–0.41) onto which is applied a layer of frothed radiation-curable polymer composition (0.25–0.66) which is then exposed to radiation until cured. The topcoat layer (0.05–0.25) is applied onto the foam, followed by curing of the topcoat. The reverse side of the substrate is then coated with the adhesive tie ply layer (0.03–0.08) followed by the pressure sensitive adhesive layer (0.03–0.13). Laminate A can be used on business form and envelope printing presses to transfer ink from the printing plate to the paper. Total gauge of laminate A is about 0.90 mm.

Laminates B and C are prepared from two and three layers, respectively, of substrate (0.10–0.64) between each of which is sandwiched a layer of foamed radiation-curable polymer (0.08–0.64) by spreading a frothed radiation-curable polymer composition between two layers of the substrate. The three layers pass through a spreading mechanism to provide the proper gauge, then are quickly exposed to radiation to cure the polymer and bind the layers. For laminate C, the laminate from the previous operation is used as a substrate onto which another layer of frothed radiation-curable polymer composition (0.08–0.38) is spread, covered with the third layer of substrate (0.10–0.38), passed through the gauging mechanism, and exposed to radiation to cure the photopolymer. Next, a layer of topcoat (0.05–0.50), preferably nylon, is applied to one of the outer substrate surfaces. Typical gauge of laminate B is about 1.3 mm and of laminate C is 1.7 mm.

Laminates B and C are useful as packing blankets on newspaper offset presses and can also be used as a compressible printer's blanket when the topcoat is selected to be ink receptive and solvent resistant.

Laminates D and E are prepared by applying a layer of adhesive tie-ply (0.03–0.08) followed by a layer of pressure sensitive adhesive (0.03–0.13) to those outer substrate surfaces of laminates B and C, respectively, which have not been coated with the topcoat.

Laminates D and E are useful as packing blankets on newspaper offset presses wherein the blankets are attached to the press roll or cylinder by means of the pressure sensitive adhesive.

Laminates F and G are prepared from three and four layers of substrate (0.10–0.41), respectively, between two layers of which is sandwiched a layer of frothed radiation-curable polymer composition (0.20–0.97) followed by exposure to radiation to cure the foam as described above. To this sandwiched construction, additional layers of substrate are attached by spreading a layer of non-foamed radiation-curable polymer composition (0.03–0.13) followed by the substrate, and then curing by exposure to radiation. For laminate G, the fourth ply of substrate is attached to the third ply using a second layer of non-foamed radiation-curable polymer. Finally, a topcoat (0.13–0.51) is applied to the outer substrate layer adjacent to the foam layer. Typical gauge of laminates F and G are 1.7 mm and 2.1 mm respectively.

Laminates F and G are useful as compressible offset printing blankets on a Web or Sheet Fed Offset Printing Press. The foam layer provides compressibility which allows greater packing latitude and results in lower pressure at a given impression over noncompressible blankets. Laminate F can be used as an engraver's gum construction when the topcoat is selected from an engraver's gum compound and to the bottom substrate surface is added a layer of non-foamed radiation-curable polymer.

Laminates H and I are prepared from a layer of substrate (0.10–0.38), preferably polyvinylchloride film, to which is applied a layer of non-foamed radiation-curable polymer composition (0.03–0.08) followed by exposure to radiation to cure the composition. To the cured non-foamed composition is applied a layer of foamed radiation-curable polymer composition (0.20–0.51) followed by radiation curing. For laminate H, to the cured foamed composition is applied a topcoat (0.13–0.51), preferably of the non-foamed radiation-curable polymer version. For laminate I, to the cured foamed composition is applied a second layer of non-foamed composition, then a second layer of substrate, preferably polyvinylchloride film, followed by radiation curing and application of a topcoat. To the first substrate layer is applied a layer of adhesive tie-ply (0.03–0.08) and a layer of pressure sensitive adhesive (0.03–0.13). Typical total gauges of laminates H and I are 0.081 mm and 0.90 mm respectively.

Laminates H and I are useful on business form and envelope offset printing presses to transfer ink from the printing plate to the paper.

Laminate J is prepared by spreading a layer of frothed radiation-curable polymer composition (0.38–1.0) onto a layer of substrate (0.10–0.41), preferably a woven fabric, covering the froth with a layer of clear releasable film, passing the three layers through a spreading mechanism to set the proper gauge, then exposing to radiation to cure the foam. After curing, the releasable film is stripped off the foam. Next, a layer of adhesive tie-ply (0.03–0.08) and a layer of pressure sensitive adhesive (0.03–0.13) are applied to the bottom of the substrate layer. Total gauge is about 0.81 mm.

Laminate K is prepared by applying a layer of non-foamed radiation-curable polymer composition (0.03–0.08) onto a layer of substrate (0.10–0.41), a non-compressible polyester film, followed by radiation curing. To the cured non-foamed composition is applied a layer of frothed radiation-curable polymer composition (0.38–1.0) which is covered by a clear releasable film, passed through a spreading mechanism to set the proper gauge, then exposed to radiation to cure the foam layer. After curing, the releasable film is stripped off the foam layer. Next, a layer of adhesive tie-ply (0.03–0.08) and a layer of pressure sensitive adhesive (0.03–0.13) are applied to the bottom of the substrate layer. Total gauge is about 0.81 mm.

Laminate L is prepared by spreading a layer of frothed radiation-curable polymer composition (0.20–0.30) between two layers of substrate (0.10–0.41) in sandwich fashion, passing through a spreading mechanism to set the proper gauge and then exposing the construction to radiation. To one outer substrate surface is applied a layer of non-foamed radiation-curable polymer composition (0.03–0.08) followed by radiation curing. To the cured non-foamed layer is applied a layer of frothed radiation-curable polymer composition (0.08–0.13) which is covered with a layer of clear releasable film, passed through a spreading mechanism to set the proper gauge, then exposed to radiation to cure the foam. After curing, the releasable film is stripped off the foam. Next, a layer of adhesive tie-ply (0.03–0.08) and a layer of pressure sensitive adhesive (0.03–0.13) are applied to the remaining outer substrate surface. Typical gauge is 1.0 mm.

Laminates J, K and L are useful as compressible packing blankets for flexographic printing plates and also as packing blankets for letterpress drawsheets.

Laminate M is prepared by coating one surface of a substrate (0.76–1.27) layer with a non-foamed radiation-curable polymer composition (0.03–0.13) and curing by radiation. The other surface of the substrate is then coated with a layer of frothed radiation-curable polymer composition (0.08–0.13) which is covered with a releasable film. The laminate is then passed through a spreading mechanism to set the proper gauge and exposed to radiation for curing. After curing, the releasable film is stripped off the foam. Total gauge is about 0.81 mm.

Laminate M is useful as a box die mounting board for proofing or printing corrugated cardboard cartons. It provides a stretch controlled base for holding flexographic plates. Laminate M can also be used as a sub-laminate to which is applied a construction such as laminate B with a topcoat of engravers gum (1.27–3.8) to provide an engravers gum construction having a total gauge of about 6.4 mm.

Laminate N is prepared by spreading a layer of frothed photopolymer composition (0.20–1.0) between two layers of substrate (0.28–0.41), passing the three layers through a spreading mechanism to set the proper gauge, then exposing the construction to radiation to cure the composition and bind the layers. Total gauge is about 1.07 mm.

Laminate N can be used as a sub-laminate to prepare other constructions, e.g. laminates B, C, D, E, F, G, and L disclosed above or can be used as an insulation layer, or as padding, such as one would find under a tablecloth to prevent marring of furniture and the like.

Laminate P is a variation of laminate F wherein the topcoat, preferably a non-foamed radiation-curable polymer (0.13–0.51), is applied to the substrate layer adjacent the non-foamed radiation-curable polymer layer.

Laminate P can be used as a compressible offset printing blanket.

While all of the foregoing laminates contain at least one compressible layer, in some applications it is possible or even desirable to utilize noncompressible laminates. These laminates can be prepared by the same procedures detailed above, except that where the procedures specify the use of a foam layer, a layer of non-foamed radiation-curable polymer composition is used instead. These noncompressible laminate constructions are shown in Table II below. Typical gauges are similar to the compressible laminates.

TABLE II

| | Non-Compressible Laminate Constructions | | | | | | | | | | |
|---|---|---|---|---|---|---|---|---|---|---|---|
| Laminate | AA | BB | CC | DD | EE | GG | JJ | LL | MM | NN | O |
| Layer | | | | | | | | | | | |
| 1 | R | R | R | R | R | R | PP | PP | PP | S | PP |
| 2 | PP | S | S | S | S | S | S | S | S | PP | S |
| 3 | S | PP | PP | PP | PP | PP | A | PP | PP | S | |
| 4 | A | S | S | S | S | S | PSA | S | | | |
| 5 | PSA | | PP | A | PP | PP | | A | | | |
| 6 | | | S | PSA | S | S | | PSA | | | |
| 7 | | | | | A | PP | | | | | |
| 8 | | | | | PSA | S | | | | | | wherein the laminate designations, AA, BB, etc., refer to the similar constructions as shown for the corresponding compressible laminate constructions in Table I above. Note that in laminate LL, the foam layer No. 4 of laminate L is replaced by a layer of non-foamed radiation-curable polymer and that foam layer No. 1 of laminate L is excluded.

Laminate 0 is prepared by spreading a layer of non-foamed radiation-curable polymer composition (0.03-0.89) onto a layer of substrate (0.23-0.64), covering the polymer with either a matte finished or textured finished film, exposing to radiation to cure the composition, then stripping off the film. The use of a matte finished film provides a tack-free surface. The pattern of a textured finished film is imparted to the polymer surface. Total gauge is about 0.48 mm.

Laminate 0 is useful as either a smooth-top drawsheet or as a rough-top drawsheet in banknote printing to hold the paper sheets against the printing plate with sufficient tension to obtain a good impression. The rough texture imparted by the use of a textured finished film aids in the release of the paper from the drawsheet.

EXAMPLE

A radiation-curable composition containing 100 parts by weight (pbw) of an acrylated polyester urethane (Uvithane 782 from Morton Thiokol Incorporated), 16 pbw of hydroxyethylmethacrylate, 8 pbw of a mixed tri-aryl phosphate plasticizer (Kronitex 100 from FMC Corporation), 1.5 pbw of 2,2-dimethoxy-2-phenylacetophenone (Irgacure 651 from Ciba-Geigy Corporation) and 1 pbw of a polyoxyethylene octyl phenol (Triton X100 from Rohm & Haas Company) surfactant was frothed in an Oakes TM mixer using air as the frothing gas at such a level as to give 21 to 28 volume percent of air based on the radiation-curable composition. The froth which had a consistency similar to shaving cream was sandwiched between two layers of cotton fabric, passed through a spreading means at a speed of 6 cm/sec to set the gauge, then exposed to ultraviolet radiation, using high intensity mercury lamps sold by Fusion Systems Corporation, to cure the foam. Table III shows the actual gauge of the laminate, compression and adhesion results for the indicated volume percent of air and the specific gravity of the foam layer. The actual gauge was measured with a Randall-Stickney gauge tester. The compression results were a measure of the deflection from the initial gauge as caused by the application of a 1.16MPa (168 psi) load. The adhesion test measured the peel adhesion on a one-inch strip of the laminates on a tensile tester at a travel rate of 0.85 mm/sec (2 in./min).

The above foams contained a wide variation in bubble size. Some of the bubbles were quite large. In fact, over 10% of the bubbles had a diameter equal to at least 25% of the foam gauge.

TABLE III

| Volume % Air | Specific Gravity | Gauge Actual mm | Compression, mm | Adhesion kg/cm wd |
|---|---|---|---|---|
| 21 | 0.93 | 1.05 | .095 | 0.89 |
| 28 | 0.85 | 1.05 | .121 | 0.76 |

Accounting for a nominal gauge of 0.38 mm for each layer of substrate, it can readily be determined that the gauge of the foam layers was 0.29mm.

It should be noted that while the use of certain forms of the invention are preferred, the invention is not limited to the use of any particular form of radiation, radiation-curable composition or mechanical frothing.

It is to be understood that not all foams which are prepared according to the practice of the present invention are capable of being used for all purposes and devices described herein. For example not all the foams would be suitable for use in compressible printing blankets.

Although the polymer matrix of the foam need not necessarily be elastomeric in nature in order to have a compressible foam suitable for graphic art devices, it is often desirable that it be elastomeric.

The choice of radiation type and intensity as well as selection of the radiation-curable composition, and if a foam is to be prepared, the type of mechanical equipment and technique is dependent on the type of product desired. Selection is based on routine experimentation coupled with the well known prior art relating to radiation curing and foam techniques. It should be noted that in order to be compressible, a foam need not necessarily contain any elastomer.

While certain representative embodiments and details have been shown for the purpose of illustrating the invention, it will be apparent to those skilled in this art that various changes and modifications may be made therein without departing from the scope of the invention.

What is claimed is:

1. A process for producing a cured foamed polymeric composition comprising:
   (a) homogeneously and uniformly dispersing a frothing gas into a photocurable liquid composition by mechanical means to form a dispersion and;
   (b) exposing the dispersion to a source of actinic radiation.

2. The process of claim 1 wherein the photocurable composition is comprised of an oligomer and a reactive diluent.

3. The process of claim 2 wherein the photocurable composition is further comprised of a surfactant.

4. The process of claim 3 wherein the photocurable composition is further comprised of a photoinitiator.

5. The process of claim 4 wherein the photocurable composition is further comprised of a plasticizer.

6. The process of claim 2 wherein the frothing gas is selected from the group consisting of air and an inert gas.

7. The process of claim 6 wherein the frothing gas is air.

8. The process of claim 6 wherein the frothing gas is nitrogen.

9. The process of claim 6 wherein the amount of frothing gas dispersed in the liquid composition is such as to produce a dispersion having a specific gravity from about 0.450 to about 0.875.

10. The process of claim 1 wherein the mechanical means is a continuous mechanical frothing machine in a closed system.

11. The process of claim 10 wherein the frothing gas is injected into the liquid composition upstream of the mechanical frothing machine.

12. The process of claim 10 wherein the frothing gas is injected into the liquid composition in the mechanical frothing machine.

13. The process of claim 11 wherein the mechanical frothing machine homogeneously and uniformly distributes the frothing gas in the form of small bubbles throughout the liquid composition by a cutting and shearing action imparted by concentric rows of blades projecting from a rotating rotor which are interposed between similar concentric rows of blades which project from a stationary stator.

14. A process for producing a cured foamed polymeric composition comprising the steps of:
 (a) blending together ingredients to form a liquid photocurable composition;
 (b) transferring the liquid photocurable composition in a closed system to a continuous mechanical frothing machine;
 (c) injecting into the liquid photocurable composition a frothing gas selected from the group consisting of air and an inert gas at such a rate to produce a froth having a specific gravity from about 0.450 to about 0.875;
 (d) mechanically frothing the liquid/gas mixture in the mechanical frothing machine to form a froth;
 (e) discharging the froth from the mechanical frothing machine; and
 (f) exposing the froth to actinic radiation to form a cured foam.

15. The process of claim 14 wherein the liquid photocurable polymeric composition is formed by:
 (a) dissolving a photosensitizer in a reactive diluent to form a solution;
 (b) mixing a surfactant and a plasticizer into the solution of step (a) to form a mix; and
 (c) blending the mix from step (b) with an oligomer to form a liquid photocurable composition.

16. The process of claim 15 further comprising the step of deaerating the liquid photocurable composition prior to the transferring step.

* * * * *